United States Patent [19]
Robitschko et al.

[11] Patent Number: 4,887,065
[45] Date of Patent: Dec. 12, 1989

[54] CONTROL SYSTEM FOR A COMBINED CENTRAL LOCKING AND BURGLAR ALARM SYSTEM FOR VEHICLES

[75] Inventors: Peter Robitschko; Klaus Claar, both of Sindelfingen; Hans Deischl, Jettingen; Josef Schumacher, Reutlingen, all of Fed. Rep. of Germany

[73] Assignee: Daimler-Benz AG, Stuttgart, Fed. Rep. of Germany

[21] Appl. No.: 264,542

[22] Filed: Oct. 31, 1988

[30] Foreign Application Priority Data

Oct. 30, 1987 [DE] Fed. Rep. of Germany ....... 3736776

[51] Int. Cl.⁴ ............................................. B60R 25/10
[52] U.S. Cl. .................................... 340/430; 340/426; 340/528; 340/542; 70/264; 307/10.1; 307/10.2
[58] Field of Search ..................................... 340/63–65, 340/541, 825.32, 542, 543, 527, 528, 430, 426, 425.5, 428; 307/10 AT, 9.1, 10.1, 10.2; 180/173, 287; 70/379 R, 379 A, 239, 264, DIG. 49

[56] References Cited

U.S. PATENT DOCUMENTS

| | | | |
|---|---|---|---|
| 3,936,673 | 2/1976 | Kelly et al. | 340/63 |
| 3,967,239 | 6/1976 | Steele | 340/63 |
| 4,225,008 | 9/1980 | Colell et al. | 340/63 |
| 4,635,035 | 1/1987 | Ratzabi | 340/63 |

FOREIGN PATENT DOCUMENTS 2915213 10/1980 Fed. Rep. of Germany .
3516732 5/1985 Fed. Rep. of Germany .
3413774 10/1985 Fed. Rep. of Germany .

Primary Examiner—Donnie L. Crosland
Attorney, Agent, or Firm—Barnes & Thornburg

[57] ABSTRACT

A control arrangement for a combined central locking and burglar alarm system for motor vehicles is constructed in such a manner that an accidentally tripped false alarm can be deactivated in a single manner by a designated key and a key detection switch associated with a door locking cylinder, so that the activation state of the burglar alarm system is automatically adapted to the existing locking state of the central locking system.

12 Claims, 2 Drawing Sheets

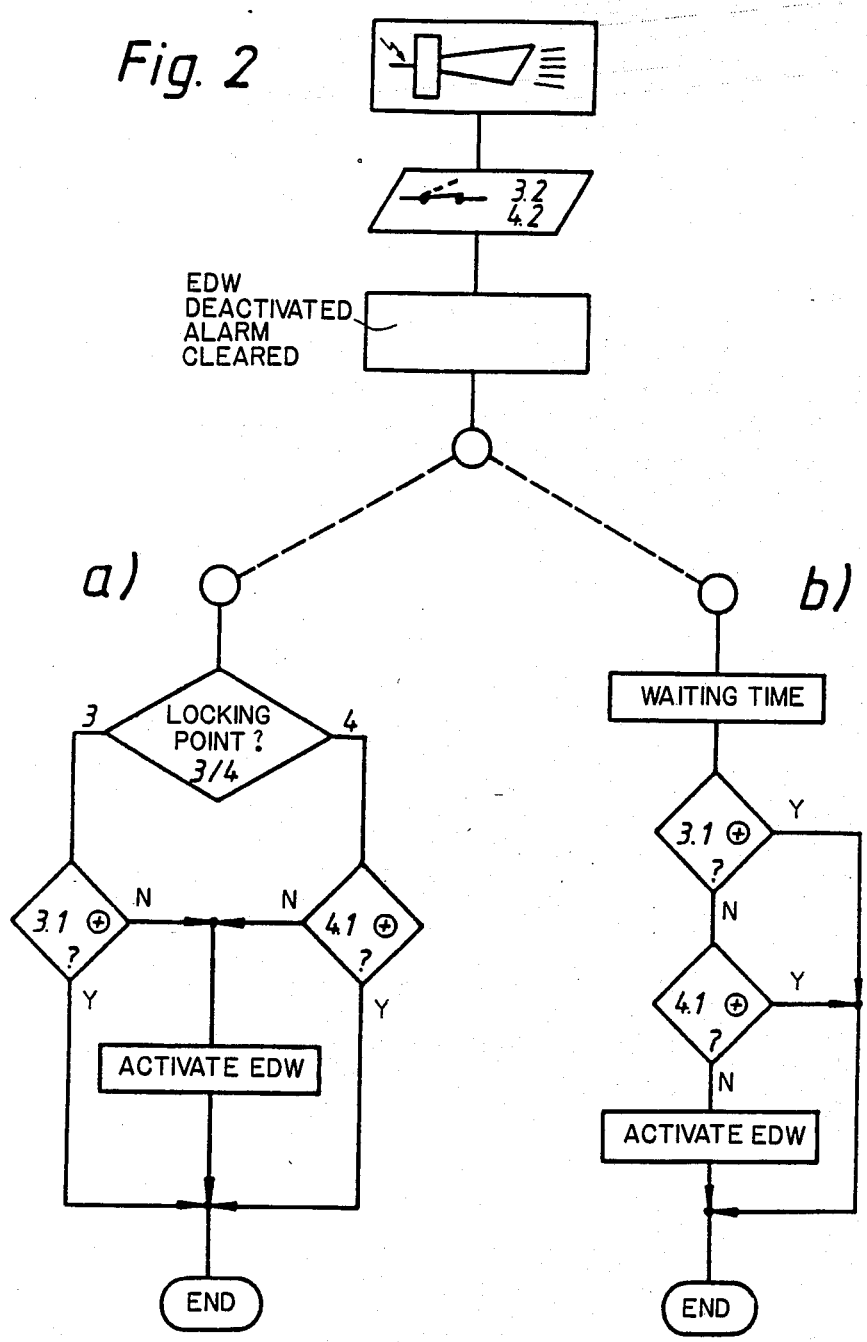

CONTROL SYSTEM FOR A COMBINED CENTRAL LOCKING AND BURGLAR ALARM SYSTEM FOR VEHICLES

BACKGROUND AND SUMMARY OF THE INVENTION

The present invention generally relates to a system for controlling the operation of a combined central locking system and burglar alarm system, and more particularly to a control system which provides an authorized user with a simple, convenient capability for operating both systems from a single locking point by a designated key.

Combined central locking system and burglar alarm system arrangements are known. Such an arrangement is disclosed in German Patent (DE-PS) No. 35 16 732, which provides for the convenient and uniform control of both the central locking system, as well as the burglar alarm system, via a single locking point on at least one door, the burglar alarm system being controlled by the same switching contact as the central locking system. When the central locking system is locked by a particular key at the designated locking point, the burglar alarm system is automatically activated, i.e., switched ready for alarm. The burglar alarm system is deactivated when the central locking system is unlocked by this key at the designated locking point. However, the above-referenced German patent fails to provide for the deactivation and resetting of an alarm which, in particular, has been accidentally tripped by authorized users.

A burglar protection system with an additional switching device for clearing an alarm tripped by an operating error is disclosed by German Patent (DE-PS) No. 29 15 213. Overall control of this system, both activation and deactivation of the system, as well as clearing the alarm after accidental activation by an authorized user, can only be effected from the passengers' compartment of the motor vehicle. The clearing and resetting operation is effected by the simultaneous operation of two different keys of a key pad arranged on the dashboard of the motor vehicle. A relationship between the operation of a central locking system and the alarm readiness of the burglar protection system is not considered in German Patent (DE-PS) No. 29 15 213.

Accordingly, it is an object of the present invention to provide a combined central locking system/burglar alarm system arrangement for shutting off an accidentally tripped false alarm and for furnishing authorized vehicle users with a simple, convenient capability for unambiguously determining the vehicle protection status.

In accordance with one embodiment of the present invention, there is provided a control system for controlling both a vehicle central locking system and a vehicle burglar alarm system from at least one locking point of the central locking system when operated by a designated key. The control arrangement comprises a lock contact for providing indicating signals representing a position of a lock associated with the at least one locking point as well as a switch for providing a detection signal in response to the presence of the designated key at the at least one locking point. A burglar alarm control device deactivates an unintentionally triggered alarm in response to a detection signal indicating the presence of the designated key at the at least one locking point and then arms the burglar alarm if the locking point is locked and disarms the burglar alarm if the locking point is unlocked in response to the indicating signals from the lock contact. A switching device selectively connects the control device of the burglar alarm system to the locking point in response to a detection signal indicating the presence of the designated key at the at least one locking point.

In accordance with another embodiment of the present invention a time delay is established after an unintentional alarm has been deactivated and before the burglar alarm control device is connected to the lock contact by the switching device.

In yet another embodiment of the present invention, the switching device connects the control device to a plurality of locking points after an unintentional alarm has been deactivated in order to determine the desired activation state of the burglar alarm system.

The system according to one embodiment of the invention enables the vehicle user to deactivate a false alarm from outside of the vehicle using his vehicle key or the designated key.

In yet another embodiment of the invention, deactivation of the false alarm can occur upon the insertion of the key in the lock or during subsequent rotation of the key by a relatively small angle, since in the latter instance it is only a matter of operating an electric microswitch arranged at the locking cylinder.

One advantage of the connection of the control device of the burglar alarm system by the switching device to the lock contact(s) of the central locking system control for the renewed synchronization of the central locking system and the burglar alarm system is that a short time after the alarm has been cleared, the user of the vehicle can visually determine, from the position of the internal locking knobs of the doors, whether the vehicle is unlocked or locked. He can rely on the fact that the burglar alarm system is activated when the vehicle is locked. A brief waiting time before the control device is connected by the switching device to the lock contacts ensures that any locking or unlocking process of the central locking system, which may have been triggered with the rotation of the key, is completed before the burglar alarm control device is connected to a locking point. However, the waiting time is not absolutely necessary if only the lock contact associated with the alarm-clearing locking point is connected to the control device by the switching device. This system can be simply integrated into the burglar alarm system control device. Naturally, this is unnecessary if only one locking point is provided with associated lock contact and electric switch as a minimum equipment.

The advantages of the generic combined central locking system/burglar alarm system, particularly also the use of the advantageous main key/auxiliary key system, are retained.

Other objects, advantages and novel features of the present invention will become apparent from the following detailed description of the invention when considered in conjunction with the accompanying drawings.

BRIEF DESCRIPTION OF THE DRAWINGS

FIGS. 2A and 2B show flowcharts explaining the operation, separate embodiments of the present invention.

DETAILED DESCRIPTION OF THE DRAWINGS

Figure 1:
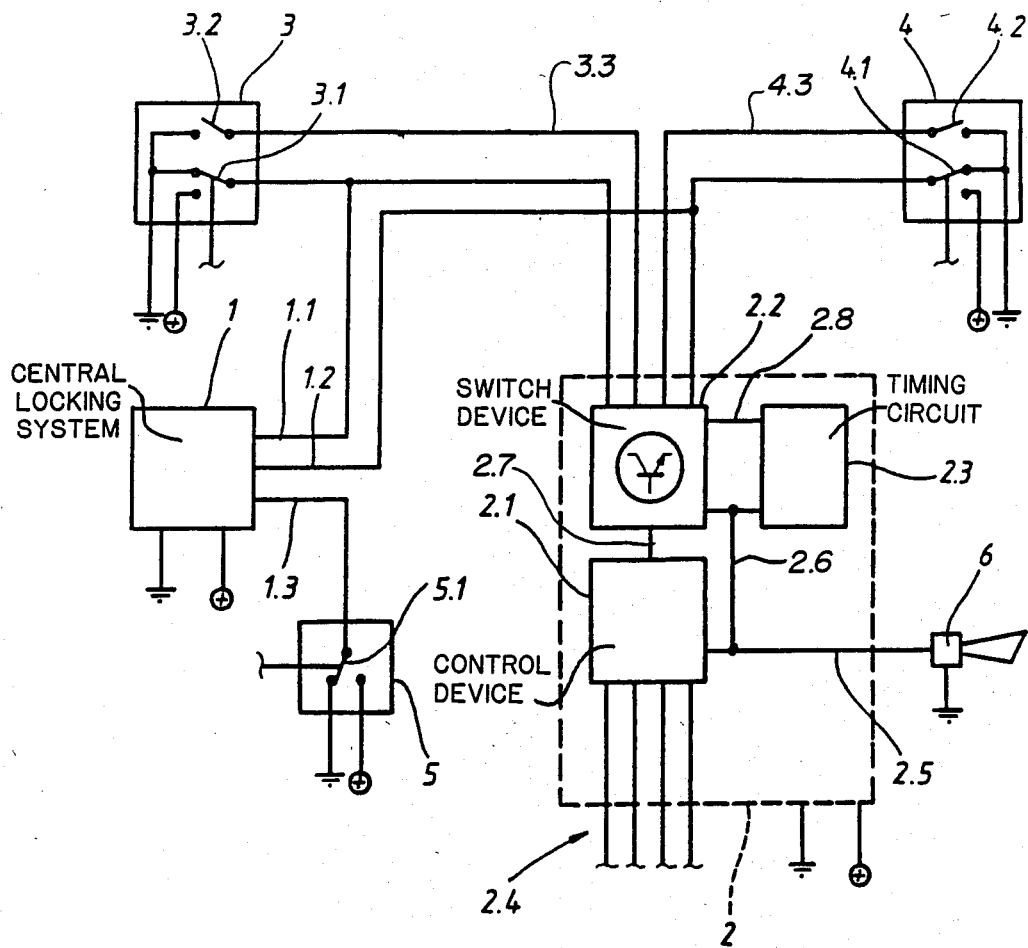
FIG. 1 shows a circuit diagram schematically illustrating one embodiment of the control system of the present invention.

Referring to FIG. 1, a combined central locking system 1 (CLS) and burglar alarm system 2 (BAS) control system for resetting an accidentally tripped false alarm in accordance with the present invention is schematically represented as applied to, for example, a motor vehicle having a driver's door locking point 3, a passenger door locking point 4, as well as a trunk locking point 5, or similar access panels.

The three locking points 3, 4, and 5, used to lock and unlock the associated doors or trunk, are in each case coupled to a respective change-over lock contact 3.1, 4.1, 5.1. Each change-over lock contact 3.1, 4.1, 5.1 indicates the position of each associated locking point by switching state, both when the associated locking points are operated by key or the like, as well as by actuating elements (not shown) of the central locking system 1 via switching linkage or similar conventional arrangements. During this switching process, the electric potential of the change-over lock contact 3.1 is altered from positive to ground or from ground to positive, depending on the initial change-over lock contact position. The central locking system 1 is driven by the first one of these potential state changes which, as a rule, is generated at a manually operated locking point, via the connecting lines 1.1, 1.2, 1.3 for locking or unlocking of all locks of the central locking system 1 provided with actuating elements.

The change-over lock contacts 3.1 and 4.1 of the driver's and passenger's door locking points 3 and 4, respectively, are also connected to the burglar alarm system 2 via switching device 2.2 as will be described in more detail hereinafter. Similarly, one electric (pin) switch 3.2 and 4.2 at each of the locking points 3 and 4, respectively, is electrically connected to the burglar alarm system 2. The electric switches 3.2 and 4.2 are preferably operated by a particular or designated key according to one embodiment of the invention. This designated key (not shown) advantageously operates the locking points 3 and 4, their associated change-over locks contacts 3.1 and 4.1 as well as switches 3.2 and 4.2 respectively.

The burglar alarm system 2 is schematically represented as including a control device 2.1, a switching device 2.2 and a timing circuit 2.3. The switching device 2.2 is connected to each locking point 3, 4 via, for example, separate connection lines 3.3, 4.3 which connect the switching device 2.2 to the lock contact 3.1, 4.1 and switch 3.2, 4.2 respeciively, of each locking point 3, 4. The control device 2.1 is connected to the switching device 2.2 via line 2.7 as well as to sensor input lines 2.4 and alarm line 2.5 for controlling the operation of an alarm 6. The timing circuit 2.3 is connected to the alarm line 2.5 via branch 2.6 as well as to the switching device 2.2 via line 2.8. Further, switching device 2.2 is connected to the alarm 6 via the branch 2.6.

The switching device 2.2 may be constructed in a conventional manner with relays, switching transistors, or the like or comprise a microprocessor or the like. When detection signals from, for example, switches 3.2, 4.2 are received, the switching device 2.2 is electrically connected to the respctive potential state of the associated change-over lock contact 3.1, 4.1 by way of appropriate relays or switching transistors in switching device 2.2. According to one embodiment of the present invention, the control of these relays which connect the switching device 2.2 to the lock contact 3.1, 4.1 is affected by an input signal from timing element 2.3 via line 2.8 as will be described in more detail hereinafter.

Since the switching device 2.2 has different input terminals for each change-over lock control 3.1, 4.1 and each electric switch 3.2, 4.2, identification of each lock contact 3.1, 4.1 and each electric switch 3.2, 4.2 generating a signal received by the switching device 2.2 is possible by means of the appropriate storage circuitry such as buffers or registers. This aspect or capability of the switching device 2.2 is of importance when more than one locking point is provided with switch 3.2, 4.2 and all the locking points are considered in deciding whether to arm or disarm the alarm system.

When an alarm input signal is inputted to switching device 2.2 via branch 2.6 and a detection signal from switch 3.2 or 4.2 is received by the switching device 2.2, the alarm is deactivated and the storage circuitry of switching device 2.2 noted above is activated in any suitable manner to indicate which one of the locking points 3,4 has been operated by the designated key to close the switch 3.2, 4.2 and thereby clear the alarm. The decision to either arm or disarm the burglar alarm system 2 is effected by connecting the control 2.1 via line 2.7 to the switching device 2.2 which is now connected to the lock contact 3.1, 4.1 of the locking point 3, 4 from which the detection signal was received. This process can be accomplished by setting control device 2.1 to disarm the alarm system 2 in response to a positive potential at the lock contact 3.1, 4.1 of the operated locking point 3, 4 and to arm the alarm system 2 in response to a ground potential at the lock contact 3.1, 4.1. Since each lock contact 3.1, 4.1 for each locking point 3, 4 is separately connected to the switching device 2.2, it is possible to include logic circuitry capable of determining the potential state of each lock contact 3.1, 4.1 and provide a signal to control device 2.1 via line 2.7 which will arm or disarm the burglar alarm system 2 in accordance with the locking state of all the locking points 3, 4 of the central locking system 1.

As described above, the switching device 2.2 is set by the potential state changes of the change-over lock contacts 3.1 and 4.1 and switching signals of the electric switches 3.2 and 4.2. The switching device 2.2 activates the control device 2.1 to arm the burglar alarm system 2 when initially a switching signal of the respective electric switch 3.2 or 4.2 is initially present from one of the locking points 3 or 4, and then additionally a potential state change of the associated change-over lock contact 3.1 or 4.1 from positive to ground is present, i.e. from an unlocked to a locked condition. The burglar alarm system 2 is deactivated with a potential state change from ground to positive from change-over contacts 3.1 or 4.1. In any case, the electric switch 3.2 or 4.2 at the locking point is arranged to be operated before the respective change-over contacts 3.1, 4.1.

The alarm is tripped if the activated control device 2.1 is supplied with a signal from one or more inputs 2.4 from, such as, a motion sensor, proximity sensor or other similar and conventional burglar alarm sensors. For example, a signaling horn 6, connected by alarm line 2.5 to the control device 2.1 of the burglar alarm system 2, is activated by an alarm execution signal to sound an alarm. Naturally, other alarm signal generators, for example, visual signals or radio signals, can also be used, and are contemplated by the present invention.

As noted above, the alarm line 2.5 is also connected by branch 2.6 to the switching device 2.2 and to the timing circuit 2.3 for transmitting the alarm execution signal.

The flowchart of FIG. 2 shows the operation of a false alarm deactivation according to the two separate embodiments of the invention and thus also expands on the purpose of the branch 2.6 of the alarm line 2.5.

The flowchart starts with the alarm execution state of the burglar alarm system 2, that is to say the signaling horn 6 is activated with the alarm execution signal via the alarm line 2.5, as symbolically shown.

The authorized vehicle user operates one of the electric switches 3.2 or 4.2 by means of the designated key. The switching signal produced passes to the switching device 2.2 at which an alarm execution signal is also present via branch 2.6. Both signals are combined to the effect that the alarm is deactivated and the burglar alarm system is disarmed.

Two different further sequences (a) and (b) are now implemented in accordance with different embodiments of the invention as shown in FIG. 2. In sequence (a), the timing circuit 2.3, constructed as hold circuit, is activated with the deactivation of the alarm or with the deactivation alarm execution signal via branch 2.6, in such a manner that the switching device 2.2 is driven by the output of the timing circuit 2.3 instead of by one of the electric switches 3.2 or 4.2 as noted above.

In this embodiment, the switching device 2.2 includes the storage circuit for determining from which locking point (3) or (4) the alarm was deactivated, this determination being shown as a first branch in the flowchart. Activated by the timing circuit 2.3, the switching device 2.2 establishes a connection between the change-over contacts 3.1 or 4.1 and the control device 2.1 of the burglar alarm system 2 even when switches 3.2 and 4.2 are open. In the present sequence, only the change-over contact 3.1, 4.1 from whose locking point 3, 4 the alarm was deactivated is switched into connection with control circuit 2.1 as shown in the two adjoining branches.

If a positive potential is present at the change-over contact 3.1, 4.1, the central locking system 1 is unlocked and the burglar alarm system 2 is not activated (y-branches). If, in contrast, ground potential (n-branches) is present, the burglar alarm system 2 is automatically reactivated. The vehicle remains locked and alarm protected.

In sequence (a), the assumption is that the central locking system 1 is reliably locked or unlocked in accordance with the potential present at one change-over contact 3.1, 4.1. If the vehicle user has rotated the key farther than necessary for operating the electric switch 3.2, 4.2 when deactivating the alarm, the associated change-over contact 3.1, 4.1 has already been completely operated and now occupies an open state. A potential change is no longer possible automatically or controlled by the central locking system 1 because the locks are now open. For this reason, a waiting time is unnecessary before the connection of the change-over contact 3.1, 4.1 potential to the control device 2.1 for the sequence described above. A certain period for vehicle protection is preset only by the short time constant of the hold circuit.

In sequence variant (b), the timing circuit 2.3 is designed as a delay switch which allows a preset waiting time, which corresponds at least to the usual operating time of the central locking system 1, to pass after the alarm has been deactivated and then temporarily activates the switching device 2.2. In this embodiment, switching device 2.2 then establishes the connections between the two change-over lock contacts 3.1, 4.1 and the control device 2.1. The potentials of both change-over contacts 3.1, 4.1 are analyzed in the logic circuitry of the switching device 2.2 and an output provided to control device 2.1 via line 2.7. For the burglar alarm system 2 to be automatically reactivated, it is necessary that both change-over lock contacts 3.1, 4.1 exhibit ground potential, the central locking system 1 is therefore locked. This potential analysis can naturally also include the change-over lock contact 5.1 of the locking point 5 at the trunk of the vehicle or additional lock contacts.

It is clear that a waiting time can be provided for sequence (b). It ensures that all change-over contacts 3.1, 4.1 have reached their end position before the potential analysis of change-over contacts 3.1, 4.1 is conducted by the logic of the switching device 2.2, even when the central locking system 1 is driven with the clearing of the alarm. In this variant, in contrast, it is not necessary to determine the alarm-deactivating locking point so that the individual lines between the electric switches 3.1, 4.1 and the burglar alarm system 2, shown in FIG. 1, could be replaced by one common connection line.

Additionally, the resetting of the burglar alarm system is achieved by the alarm being cleared at a first locking point 3, 4 and potential analysis after a waiting time at the change-over lock contact 3.1, 4.1 of any one other locking point.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A control system for controlling both a vehicle central locking system and a vehicle burglar alarm system from at least one locking point of the central locking system when operated by a designated key, said control system comprising:
   (a) a locking contact means for providing indicating signals representing a position of a lock associated with the at least one locking point;
   (b) a key detection switch means for providing a detection signal in response to the presence of the designated key at the at least one locking point;
   (c) a burglar alarm control means for deactivating an unintentionally triggered alarm in response to a detection signal representing the presence of the designated key at the at least one locking point and for subsequently arming the burglar alarm system if the locking point is locked and for disarming the burglar alarm system if the locking point is unlocked in response to indicating signals from the lock contact means; and
   (d) a switching means for connecting the burglar alarm control means to the locking point in response to a detection signal indicating the presence of the designated key at the at least one locking point.

2. A control system according to claim 1, further comprising a timing circuit having a preset time interval corresponding to at least the time it takes to unlock or lock the central locking system for delaying the switching means from connecting the burglar alarm control means to the locking point after an unintentional alarm has been deactivated.

3. A control system according to claim 2, wherein the burglar alarm control means remains connected to the lock contact means through switching means for the preset time interval after the alarm has been deactivated by a detection signal from key detection switch means, control of the switching means being driven by the timing circuit which is connected in parallel with the key detection switch to switching means.

4. A control system according to claim 2, wherein the burglar alarm control means is connected to the lock contact means through switching means after an alarm has been deactivated for a preset time interval set by the timing circuit.

5. A control system according to claim 4, wherein:
(a) a plurality of locking points of the central locking system are each provided with a lock contact means, one of the locking points being associated with a vehicle driver's door; and
(b) the burglar alarm control means resets the burglar alarm system after an unintentional alarm has been deactivated only if the potential of the lock contact associated with the driver's door and at least one additional lock contact corresponds to the potential state of the driver's door lock contact.

6. A control system according to claim 1, wherein:
(a) the vehicle has a plurality of locking points each having a lock contact means and a key detection switch;
(b) the switching means has a storage circuit for determining from which locking point the key detection signal was generated; and
(c) the control means is provided with a signal from the switching means for reactivating the burglar alarm system after an alarm has been deactivated based on the state of the lock contact associated with the locking point from which the key detection signal was generated.

7. A control arrangement according to claim 6, wherein the key detection switch means generates a detection signal only upon rotation of the designated key in the locking point, such rotation being insufficient to change the present state of the lock contact.

8. A control arrangement according to claim 6, wherein the key detection means generates a detection signal when the designated key is fully inserted into the locking point.

9. A control arrangement according to claim 6, wherein at least one locking point provided with a lock contact means is operated by both a auxiliary key for operating the central locking system as well as by the designated or main key, the auxiliary key being undetectable by the key detection switch and the designated or main key being detectable by the key detection switch.

10. The central system according to claim 5, wherein each lock contact means is connected to an actuating element of the central locking system.

11. A control system for controlling both a vehicle central locking system having a plurality of locking points and central locking system actuating elements and a vehicle burglar alarm system from at least one locking point of the central locking system associated with a vehicle driver's door when operated by a designated key said control system comprises:
(a) a lock contact means for providing indicating signals representing a position of a lock associated with the at least one locking point and an additional locking point;
(b) a key detection switch means for providing a detection signal in response to the presence of the designated key at the at least one locking point;
(c) a burglar alarm control means for deactivating an unintentional alarm in response to a detection signal representing the presence of the designated key at the at least one locking point, and or subsequently arming the burglar alarm system if the additional locking point is locked and for disarming the burglar alarm system of the additional locking point is unlocked in response to indicating signals from the additional lock contact means; and
(d) a switching means for connecting the burglar alarm control means to the additional locking point in response to a detection signal indicating the presence of the designated key at the at least one locking point.

12. The control system according to claim 11, wherein the additional locking point is an actuating member of the central locking system.

* * * * *